No. 839,751. PATENTED DEC. 25, 1906.
C. E. GRUNEWALD.
SPIRIT LEVEL.
APPLICATION FILED MAY 26, 1906.
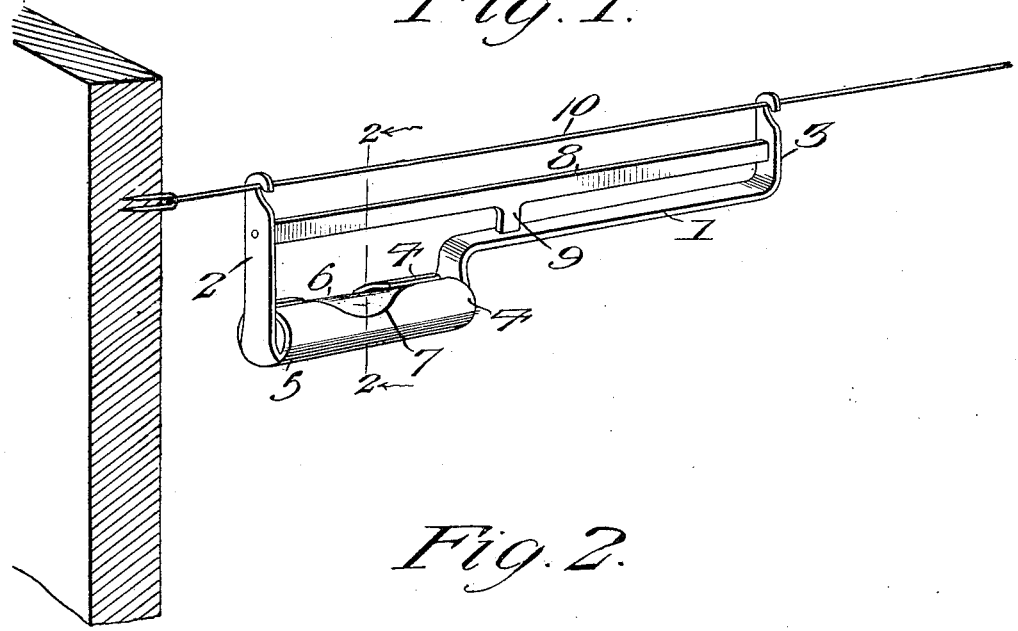
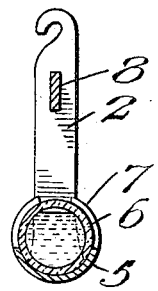

UNITED STATES PATENT OFFICE.

CHARLES E. GRUNEWALD, OF ST. LOUIS, MISSOURI.

SPIRIT-LEVEL.

No. 839,751. Specification of Letters Patent. Patented Dec. 25, 1906.

Application filed May 26, 1906. Serial No. 318,933.

*To all whom it may concern:*

Be it known that I, CHARLES E. GRUNEWALD, a citizen of the United States, residing at St. Louis, in the State of Missouri, have invented new and useful Improvements in Spirit-Levels, of which the following is a specification.

My invention relates to spirit-levels, and its primary object is to provide a device of this character which is adapted to be suspended from a line, one which is simple and durable, and one which may be manufactured and sold at a comparatively low cost.

With the above and other objects in view the invention consists in the construction, combination, and arrangement of parts hereinafter fully described, claimed, and illustrated in the accompanying drawings, wherein—

Figure 1 is a perspective view of a spirit-lever constructed in accordance with my invention, the same being illustrated in applied position upon a line; and Fig. 2 is a section on the line 2 2 of Fig. 1 looking in the direction indicated by the arrow.

Referring to the drawings by reference-numerals, 1 designates an elongated bar having its ends bent at right angles with relation to the plane thereof and formed to provide hooked suspending members 2 3. The bar is increased in transverse extent for a portion of its length at a point adjacent the member 2 to provide laterally-projecting members 4. The members 4 are bent in reverse directions to provide a tubular receptacle 5, wherein is located a spirit-tube 6 and which is cut away, as at 7, to permit the reading of the spirit-tube. The bar 1 is offset at a point adjacent the receptacle 5 to position the receptacle at a point below the plane occupied by the greater portion of the bar, whereby to permit the application of a brace. One end of the receptacle 5 is closed by the member 2, while the other end thereof is closed by the offset portion of the bar 1. The brace consists of a bar 8, having its ends reduced and set into the members 2 3, and a downward extension 9, having its ends reduced and set into the bar 1. In view of the manner in which the brace is connected to the members 2 3 and to the bar 1 it should be apparent that the members and the bar are prevented from being distorted.

The spirit-level is adapted to be suspended from a line 10 through the medium of the members 2 3, and it is applied at a point adjacent one of the attached ends of the line. The location of the receptacle 5 at a point adjacent the member 2 places the greater weight of the device near one of the attached ends of the line, and thereby prevents the sagging of the line under the weight of the level.

All parts of the spirit-level except the spirit-tube 6 are adapted to be constructed of aluminium or some other suitable material, and it may be manufactured by the stamping process, which greatly lessens the cost of its manufacture.

From the foregoing description, taken in connection with the accompanying drawings, the construction and mode of operation of the invention should be understood without a further extended description.

Changes in the form, proportions, and minor details of construction may be made within the scope of the claims without departing from the spirit or sacrificing any of the advantages of the invention.

Having fully described and illustrated my invention, what I claim is—

1. A spirit-level comprising a bar bent to provide suspending members and a receptacle, said bar being offset to position the receptacle at a point below the plane occupied by the greater portion of the bar, and a spirit-tube located within the receptacle.

2. A spirit-level comprising a bar bent to provide suspending members and a receptacle, said bar being offset to position the receptacle at a point below the plane occupied by the greater portion of the bar, one of said suspending members and the offset portion of the bar closing the ends of the receptacle, and a spirit-tube located within the receptacle.

3. A spirit-level comprising a bar bent to provide suspending members and a receptacle, said bar being offset to position the receptacle at a point below the plane occupied by the greater portion of the bar, a brace connected to the suspending members and the bar, and a spirit-tube located within the receptacle.

4. A spirit-level comprising a bar provided with suspending members and a receptacle, said bar being offset to position the receptacle at a point below the plane occupied by the greater portion of the bar, the ends of said receptacle being closed by one of the suspending members and the offset portion of the bar, and a spirit-tube located within the receptacle.

5. A spirit-level comprising a bar provided with suspending members and a receptacle, said receptacle being located at a point adjacent one of the suspending members, said bar being offset to position the receptacle at a point below the plane occupied by the greater portion of the bar, the ends of the receptacle being closed by one of the suspending members and the offset portion of the bar, and a spirit-tube located within the receptacle.

In testimony whereof I affix my signature in presence of two witnesses.

CHARLES E. GRUNEWALD.

Witnesses:
A. C. BIELENBERG,
ROBERT SCHENKEN.